(12) United States Patent
Dumas et al.

(10) Patent No.: US 7,120,620 B2
(45) Date of Patent: Oct. 10, 2006

(54) METHOD AND SYSTEM FOR FORECASTING EVENTS AND THREATS BASED ON GEOSPATIAL MODELING

(75) Inventors: Mark E. Dumas, Vienna, VA (US);
Ruth P. Willis, Alexandria, VA (US);
Larry E Willis, Alexandria, VA (US)

(73) Assignee: Spatial Data Analytics Corporation, Vienna, VA (US)

( * ) Notice: Subject to any disclaimer, the term of this patent is extended or adjusted under 35 U.S.C. 154(b) by 0 days.

(21) Appl. No.: 11/098,351

(22) Filed: Apr. 4, 2005

(65) Prior Publication Data

US 2005/0222879 A1 Oct. 6, 2005

Related U.S. Application Data

(60) Provisional application No. 60/558,654, filed on Apr. 2, 2004.

(51) Int. Cl.
*G06F 17/00* (2006.01)
*G06N 7/00* (2006.01)
*G06N 7/08* (2006.01)

(52) U.S. Cl. .......................... 706/58; 706/46; 706/14; 706/45

(58) Field of Classification Search ................. 706/58, 706/46, 14, 45
See application file for complete search history.

(56) References Cited

U.S. PATENT DOCUMENTS

| | | | | |
|---|---|---|---|---|
| 5,781,704 | A * | 7/1998 | Rossmo | 706/45 |
| 5,805,446 | A * | 9/1998 | Hatakeyama et al. | 700/28 |
| 5,832,187 | A * | 11/1998 | Pedersen et al. | 706/45 |
| 6,442,483 | B1 * | 8/2002 | Doglione | 701/300 |
| 6,606,494 | B1 | 8/2003 | Arpee et al. | |
| 2002/0035432 | A1 | 3/2002 | Kubica et al. | |
| 2003/0083073 | A1 * | 5/2003 | Cossins et al. | 455/446 |
| 2003/0115216 | A1 * | 6/2003 | Moore | 707/104.1 |
| 2003/0212494 | A1 * | 11/2003 | Alexander et al. | 702/5 |
| 2004/0034666 | A1 * | 2/2004 | Chen | 707/104.1 |
| 2004/0044553 | A1 | 3/2004 | Lambert et al. | |

OTHER PUBLICATIONS

Avencia Incorporated, "Avencia Services", Mar. 31, 2004.
Massachusetts Institute of Technology, "Beyond The Vector Data Model-Part Two", 2003, http://ocw.mit.edu/NR/rdonlyres/Urban-Studies-and-Planning.
US Department of Justice, "N.I.J.'s Mapping & Analysis for Public Safety, Briefing Book", Mar. 1, 2004(updated), http://www.ojp.usdoj.gov/nij/maps/briefingbook.html.
Harris, Keith, PhD., "Chapter 4: Mapping Crime and Geographic Information Systems", Mapping Crime: Principle and Practice, http://www.ncjrs.org, pp. 91-126.
Gorr, Wilpen, "Cloudy, With a Chance of Theft", http://www.wired.com/wired/archive/11/09/view.html, Issue 11.09, Sep. 2003.

(Continued)

*Primary Examiner*—Joseph P. Hirl
(74) *Attorney, Agent, or Firm*—Williams Mullen, PC; Thomas F. Bergert, Esq.

(57) ABSTRACT

A forecasting engine and method assists in forecasting occurrences of identifiable events and/or threats based on signature and/or pattern matching. The present invention derives signature for event-types based on a comparison of actual event data with pre-established representational surfaces. The surfaces represent proximity measurements and analysis associated with elements of the geospatial boundary being considered. The measurements and analysis can consider a vast array of potential variables of interest in order to provide a comprehensive, robust forecasting engine. In one embodiment, the present invention considers past data associated with several event-types in order to arrive at an assessment.

27 Claims, 11 Drawing Sheets

OTHER PUBLICATIONS

Singer, Emily, "Computer Model Forecasts Crime Sprees", Aug. 17, 2003.

Karuppannan, Jaishankar; Shanmugapriya, S., "Crime Analysis Mapping in India: A GIS Implementation in Chennai City".

Gorr, Wilpen; Olligschlaeger, Andreas, "Crime Hot Spot Forecasting:Modeling and Comparative Evaluation", May 6, 2002.

National Archive of Criminal Justice Data, "CrimeStat Spatial Statistics Program:Version 2.0", Mar. 31, 2004.

Switala, Kevin J., "Development of a Promising Residential Burglary-Forecasting Model".

National Law Enforcement and Corrections Technology Center, "From Description to Prediction: Crime Mapping", Summer 2001.

The Omega Group, "Identification of Urban Areas at High Risk for Criminal Activity Through Image Analysis: What are the possibilities?", Mar. 31, 2004.

Rose, S. Mariah, "Mapping Technology Takes a Bite Out of Crime", Business Geographics, Jun. 1998.

Gorr, Wilpen, "Proposed Crime Early Warning System Software", May 29, 2003 revised Jun. 5, 2003, http://morris.wharton.upenn.edu/forecast/crime/crimeearlywarningsystem.pdf.

Elder, Bethany, "Researchers Develop Crime Prevention Software", Carnegie Mellon News Periodical, Mar. 31, 2004.

Rayment, Murray R., "Spatial and Temporal Crime Analysis Techniques", Vancouver Police Department Technical Memorandum, Aug. 1995.

* cited by examiner

METHOD AND SYSTEM FOR FORECASTING EVENTS AND THREATS BASED ON GEOSPATIAL MODELING

REFERENCE TO RELATED APPLICATIONS

This application claims the benefit of U.S. provisional patent application Ser. No. 60/558,654, filed Apr. 2, 2004 and entitled "Method and System for Event and Result Prediction based on Geospatial Modeling", the disclosure of which is incorporated herein by reference.

STATEMENT REGARDING FEDERALLY SPONSORED RESEARCH

This invention was made with U.S. Government support from the U.S. Naval Research Laboratory under contract No. N00173-03-C-2037. The U.S. Government has certain rights in the invention.

FIELD OF THE INVENTION

The present invention relates to spatial modeling, and more particularly provides a system and method for forecasting events and results based on geospatial modeling.

BACKGROUND OF THE INVENTION

Geospatial modeling offers an approach to solutions to a variety of corporate, governmental and individual problems. For example, when a law enforcement or fire department agency seeks to analyze or react efficiently to crimes or fires, respectively, geospatial modeling might be used to recommend the reallocation of patrols based on changes in the pattern of criminal activity. As another example, when a retail chain seeks a location to open a new store, geospatial modeling might be used to determine a viable location based on available demographic information.

What is lacking and what is needed is a way to model information geospatially which will assist in forecasting events and/or threats based on past events or threats. No previous systems use a complete geospatial model as disclosed by the present invention to assess where an arsonist might act next, for example, or where a bomb might be detonated, based on previous occurrences related to such threats.

SUMMARY OF THE INVENTION

The present invention provides a forecasting engine and method which assists in forecasting occurrences of identifiable events and/or threats based on signature and/or pattern matching. The present invention derives signature for event-types based on a comparison of actual event data with pre-established representational surfaces. The surfaces represent proximity measurements and analysis associated with elements of the geospatial boundary being considered. The measurements and analysis can consider a vast array of potential variables of interest in order to provide a comprehensive, robust forecasting engine. In one embodiment, the present invention considers past data associated with several event-types in order to arrive at an assessment.

A method of forecasting event likelihoods in accordance with one aspect of the invention involves the steps of: establishing a geospatial boundary and a grid containing a plurality of cells within said boundary; establishing at least one layer imposed upon the grid, the layer being indicative of geospatial characteristics of at least one variable of interest; identifying a proximity measurement of a cell element for each cell to the variable of interest, and for indexing said proximity measurement for each cell; receiving geospatial information related to one or more past events of at least one event type, including location information for said one or more past events; identifying and indexing a proximity measurement from the location information for each of said one or more events to the at least one variable of interest; deriving a signature pattern for said event type; and determining a level of signature match between said derived signature pattern and at least one cell of said plurality of cells through comparison with said proximity measurement.

DETAILED DESCRIPTION OF THE PREFERRED EMBODIMENTS

Figure 1:
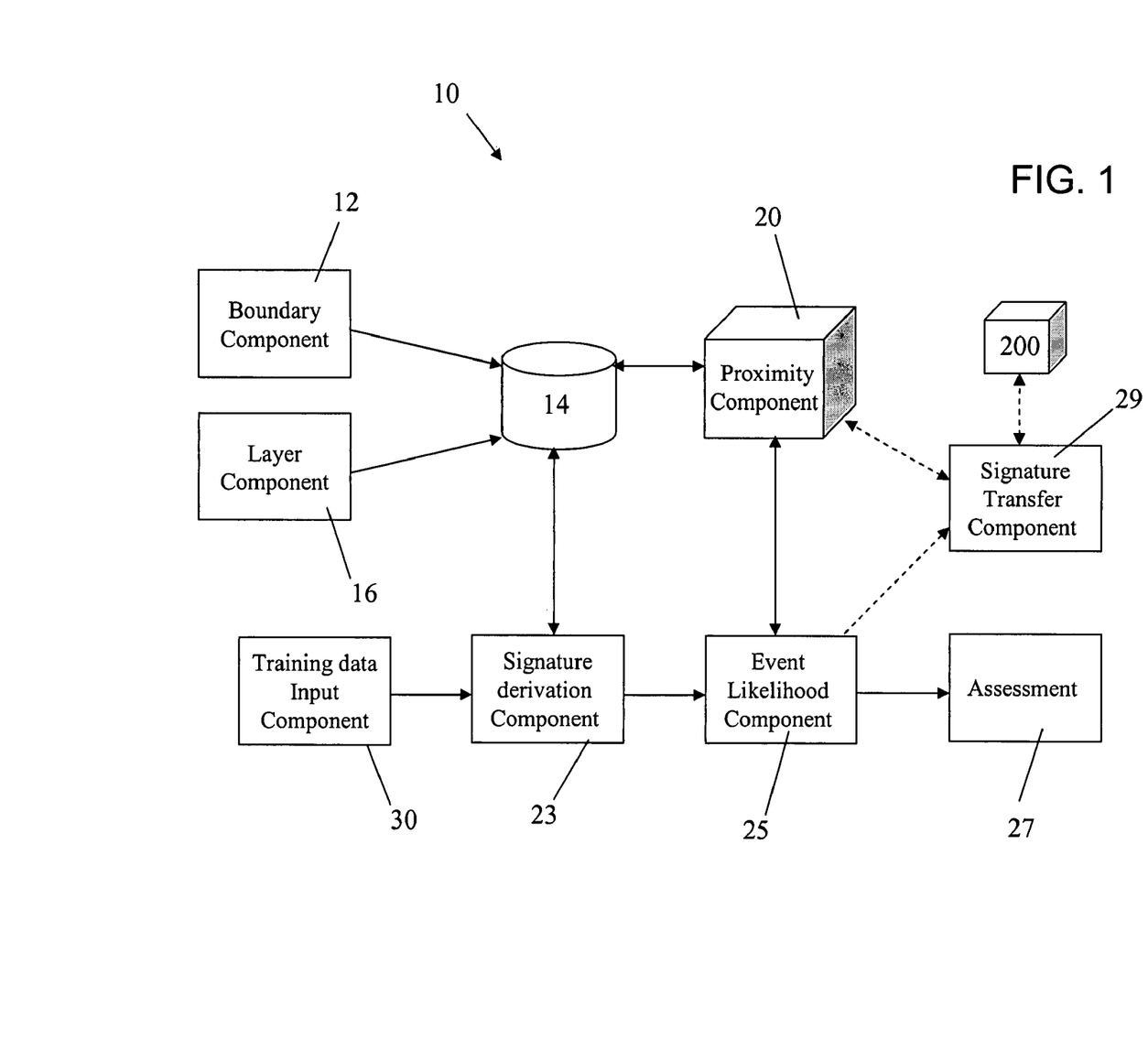
FIG. 1 shows a block diagram illustrating the interaction of several components of one embodiment of the present invention.
Figure 4:
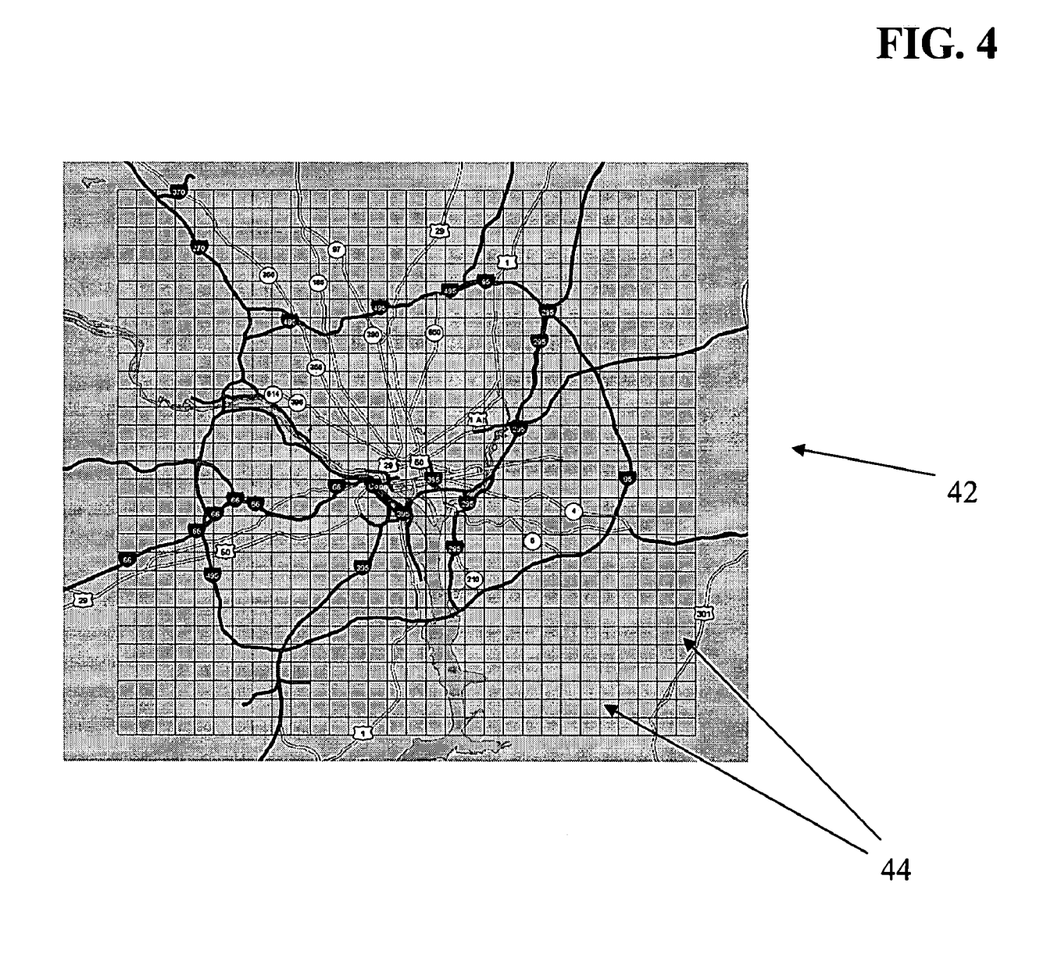
FIG. 4 shows the diagram of FIG. 3 with a grid overlay.

As shown in FIG. 1, the present invention provides a system 10 including a boundary component 12 which allows the system or a user to set forth or incorporate a geospatial boundary to be analyzed in accordance with the present invention. The boundary component also can specify individual cells within the boundary. Cells can be provided in a grid overlay such as shown in FIG. 4, with each cell being a regular and square-shaped element in a square- or rectangular-shaped grid. In one embodiment, boundary information and cell information can be stored in database 14 for one or more areas of interest. The boundary component can also be provided with a mask filter, in one embodiment, to designate areas within a boundary that need not be analyzed. For example, if a given area of interest includes a large body of water, and the events being analyzed require land-based location, the cells over the body of water would not help determine an assessment in accordance with the present invention. Accordingly, the mask filter element can remove any such cells within a boundary from consideration.

The layer component 16 allows the system or a user to specify or incorporate one or more layers of geospatial features or characteristics pertaining to at least one variable of interest. For example, a "roads" layer may be provided having information pertaining to roads within the defined geospatial boundary. The roads layer may also be provided with additional variables of interest associated with roads, such as the number of lanes in a given road, whether the road is a highway or a city street, or whether the road is one-way or two-way, for example. Example types of layers can include: roads, cities, towns, cemeteries, embassies, gardens, industrial facilities, junctions, educational facilities, bodies of water, settlements, national parks, city or county facilities, bridges, hotels, fuel stations, hospitals, airports, train stations, parking lots, campsites, rest areas, archeological sites, and churches/holy places. Other layers can include demographic information such as age, gender, income, and/or religion type, for example. It will be appreciated that the present invention can incorporate both static (e.g., bridges) and non-static (e.g., road construction locations, police speed traps, etc.) variables. Further, it will be understood that a "static" variable may include relatively static variables which are static for the duration of the forecasting methods described in accordance with the present invention. Layer and variable data are stored in spatial database 14. While boundary component 12 and layer component 16 are both shown in FIG. 1 as providing information to the same database 14, it will be appreciated that database 14 can be divided as necessary into multiple databases in order to accommodate the most suitable database architecture for a given system application.

Figure 5:
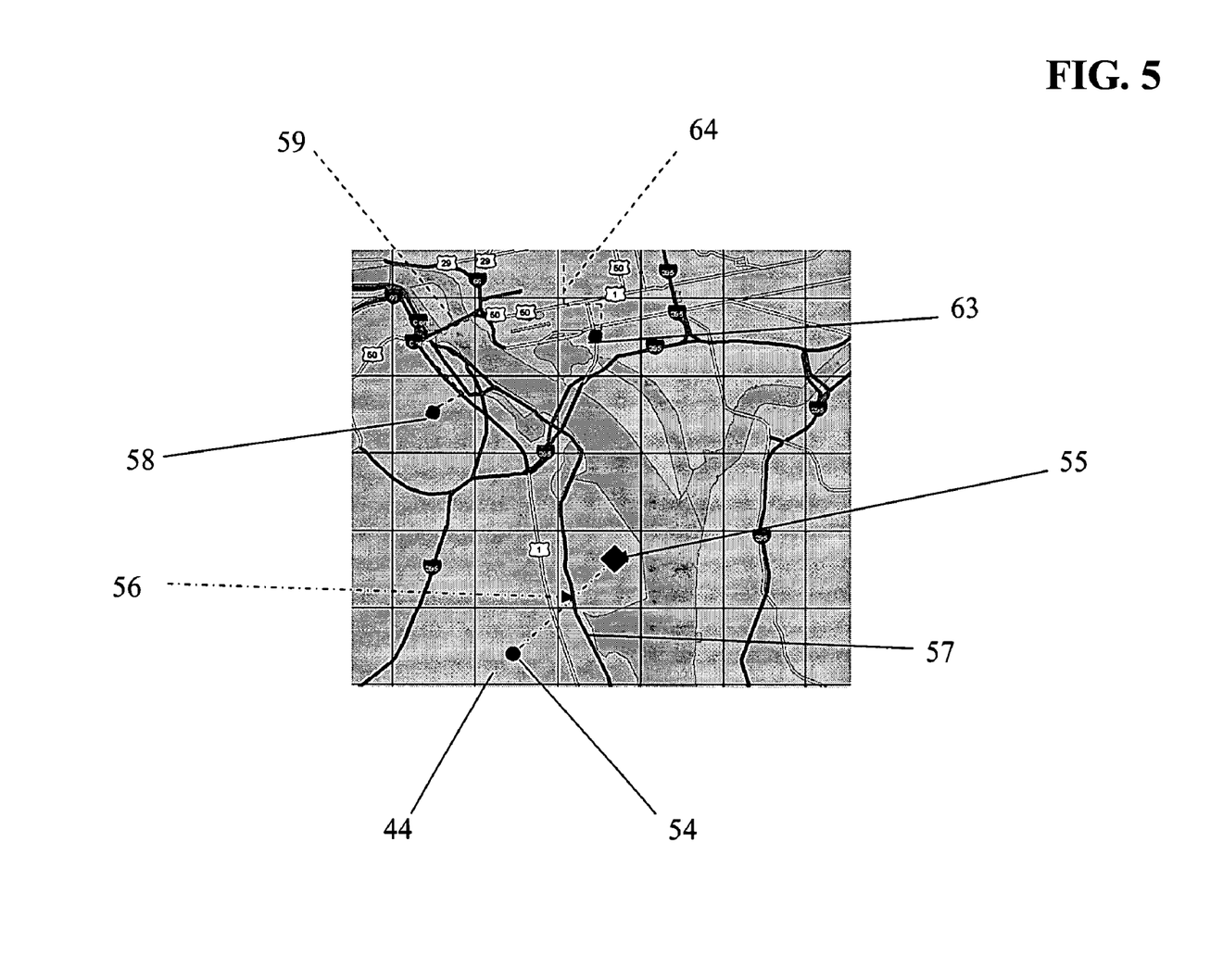
FIG. 5 shows a close-up segment of the diagram of FIG. 4 as an illustration of determining cell measurements in accordance with one embodiment of the present invention.

A proximity component 20 provides programming for identifying and measuring a proximity measurement associated with an element of each cell. For each cell, the proximity component can help determine a cell element from which measurements can be taken, as necessary. As shown in the example of FIG. 5, each square-shaped cell 44 has a middle point 54 derived from the known center of a square (i.e., the intersection of a vertical line drawn at the width halfway point with a horizontal line drawn at the length halfway point).

The proximity component can determine a measurement for each cell from the cell element (e.g., midpoint) to the variable of interest. In one embodiment, this measurement is the nearest neighbor distance. For example, as shown in FIG. 5, cell element is midpoint 54, the variable of interest can be airport 55, and the measured nearest neighbor value is distance 56. In another embodiment, this measurement is the nearest neighbor value. For example, as shown in FIG. 5, cell element is midpoint 54, the variable of interest is the number of lanes on the nearest road 57, and the nearest neighbor value is two (assuming road 57 has two lanes). The proximity component stores all measurements and calculations for later use when examining signature information associated with actual training data.

In one embodiment, layer component 16 includes an update layer element which operates to update the spatial database 14 upon receiving changes to existing layers or entirely new layers. The update layer element can trigger the layer component 16 to notify the proximity component 20 upon receipt of the updated or new layer, at which point the proximity component can either complete whatever current processing is occurring, or the proximity component can delay any further processing until the updated or new layer is incorporated. To the extent the new or updated layer is part of the currently processing assessment, the proximity component can re-initiate this segment of the analysis.

An event likelihood component (ELC) 25 performs analyses based on signatures constructed from available actual data received, for example, from an input component 30, to determine likelihood of similar events occurring in the geospatial boundary. The event data can be, for example, locations where previous armed robberies occurred. A signature derivation component 23 receives the data, and measures and analyzes it against one or more of the layers entered in database for a given geospatial boundary. The signature derivation component 23 then constructs a raw signature, reduces the information into a histogram or probability density function (see FIG. 7), and establishes a signature pattern for this event type (e.g., armed robberies) within the geospatial boundary. The ELC 25 receives the derived signature from the signature derivation component 23, then combines the signature with the measurements stored by the proximity component regarding each cell, and thereby measures a level of signature match with one or more cells for the given event type. The level of signature match can be provided as an assessment 27 which can be determined by calculating a score associated with each cell. The scores can be plotted on a choropleth graph as shown in FIGS. 8 through 11, which can give a viewer a "hot spot" type reading, for example.

In analyzing the received data, the signature derivation component can consider data related to one or more event types. For example, if there is a desire to assess locations for potential insurgent or terrorist activity, one might consider past events and/or data pertaining to suicide bombers (event type 1), fake checkpoints (event type 2) and locations where large caches of arms are discovered (event type 3). In other words, the system of the present invention is not limited to considering past events or information which is identical to the event-type being assessed and/or forecasted.

It will be appreciated that components 12, 16, 20, 23, 25, 29 and 30 can be interconnected in a variety of configurations, such as by local area network, or wide area network such as the Internet, for example. Each component may comprise an individual server having a processor, memory and storage, or may comprise a programming element of multiple programs stored and executed on a single server, for example, as is known in the art. In one embodiment, various computationally intense aspects of the invention are distributed among multiple processors to promote efficiency and speed of the present invention.

Figure 2:
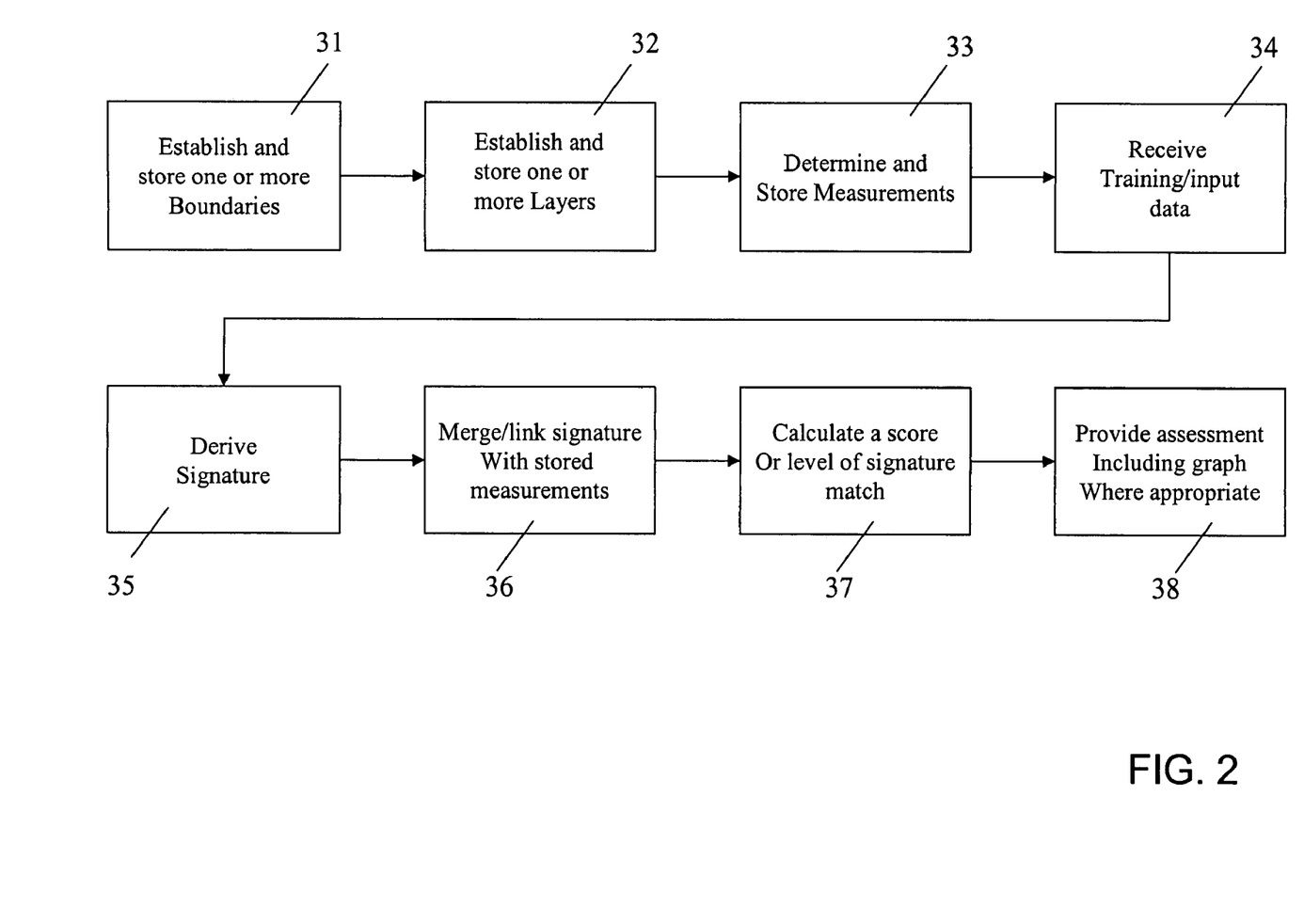
FIG. 2 is a block flow diagram illustrating steps taken in accordance with a forecasting method of one embodiment of the present invention.
Figure 3:
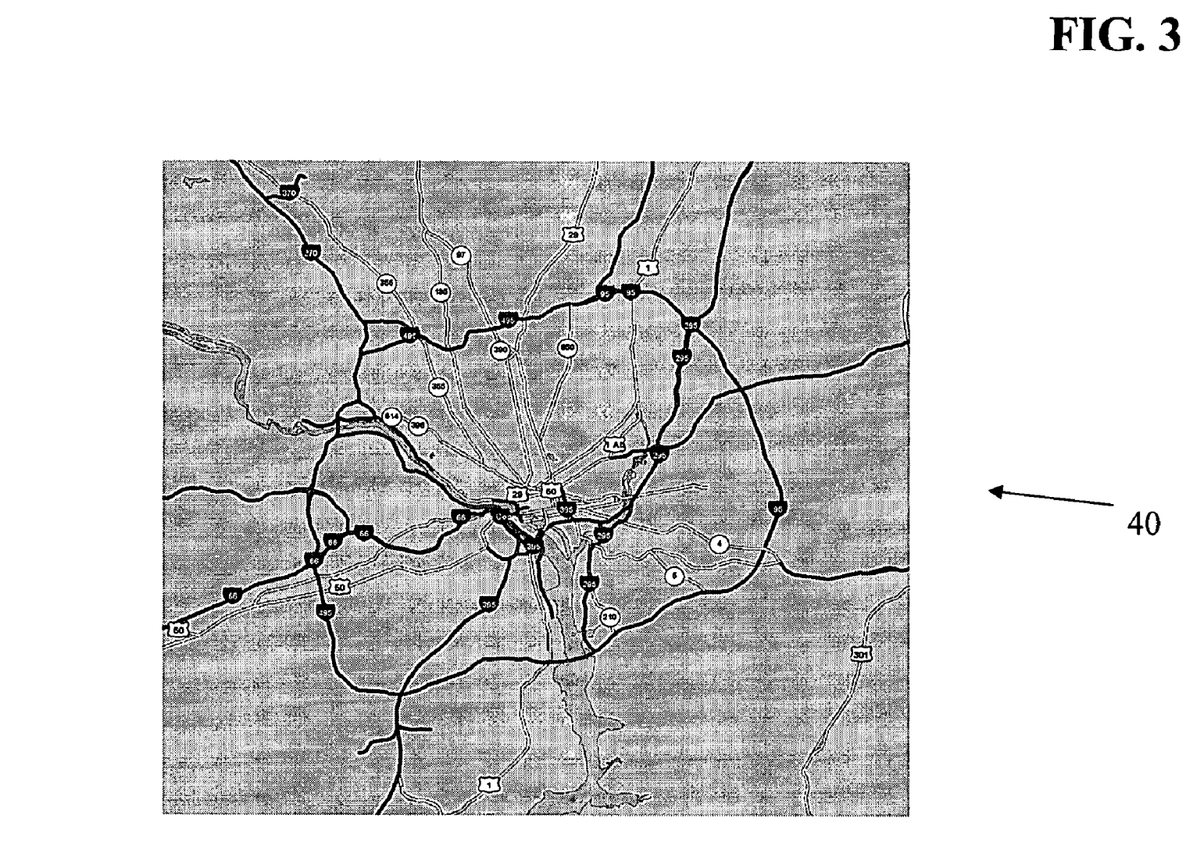
FIG. 3 is a sample diagram of an area of geographical interest in accordance with an illustrative embodiment of the present invention.

A method for employing the system of the present invention to arrive at a forecast or an assessment of the likely location of a future event-type can occur as shown in FIG. 2, and a graphical representation of some of the steps described can appear as shown in FIGS. 3 through 11. As shown at 31 in FIG. 2, and 40 in FIG. 3, a geospatial boundary can be defined, such as a 20 mile by 20 mile square area around Washington, D.C. Within this boundary, a grid 42 of smaller geographical areas (i.e., cells 44) can be created within the boundary, as shown in FIG. 4. As shown within the boundary, one or more layers having "variables of interest" (e.g., schools, roads, rivers, 7-Elevens, etc.) can be established. These layers can be thematic data sources and the establishment and input of one or more of these layers corresponds to step 32 in FIG. 2. In the particular example of FIG. 5, an airport (Reagan National Airport) is shown as at 55, along with some rivers 53 and roads 57.

Next, proximity measurements are derived and stored for each cell and for each variable of interest, as indicated at step 33. For example, as part of the method of the present invention, for each cell 44, a proximity measure can be determined for each of the different variables of interest. Using cell 44 in FIG. 5 as an example, there is a straight line proximity measure (proximity SL) 56 between the midpoint or training point 55 of cell 44 and the airport 55. A proximity (or nearest neighbor) SL measurement can be stored for each cell against each variable of interest. It will be appreciated that the present invention contemplates straight line proximity measurements as well as alternative proximity measurements, such as proximity by road traversal, proximity by time of travel, proximity by time of travel using motorized vehicle, by an adult or child walking, by an adult or child running, and so forth.

The invention further contemplates functional measurements such as described above to accommodate non-proximity or non-nearest neighbor evaluations. Other factors which can be considered in addition to proximity include natural measures, such as temperature, elevation, wind speed, precipitation, tidal information, pressure, humidity, luminance or slope, for example. Still other factors can include feature density, or demographics such as ethnic populations and population density. These types of factors can be considered "continuous" factors, to be described more completely elsewhere herein.

As opposed to continuous factors, the present invention can also consider "discrete" factors or variables, such as certain demographics like predominant religion or predominant ethnic group, for example. Other discrete factors the present invention can consider include land utilization, zoning and/or predominant vegetation.

Figure 6:
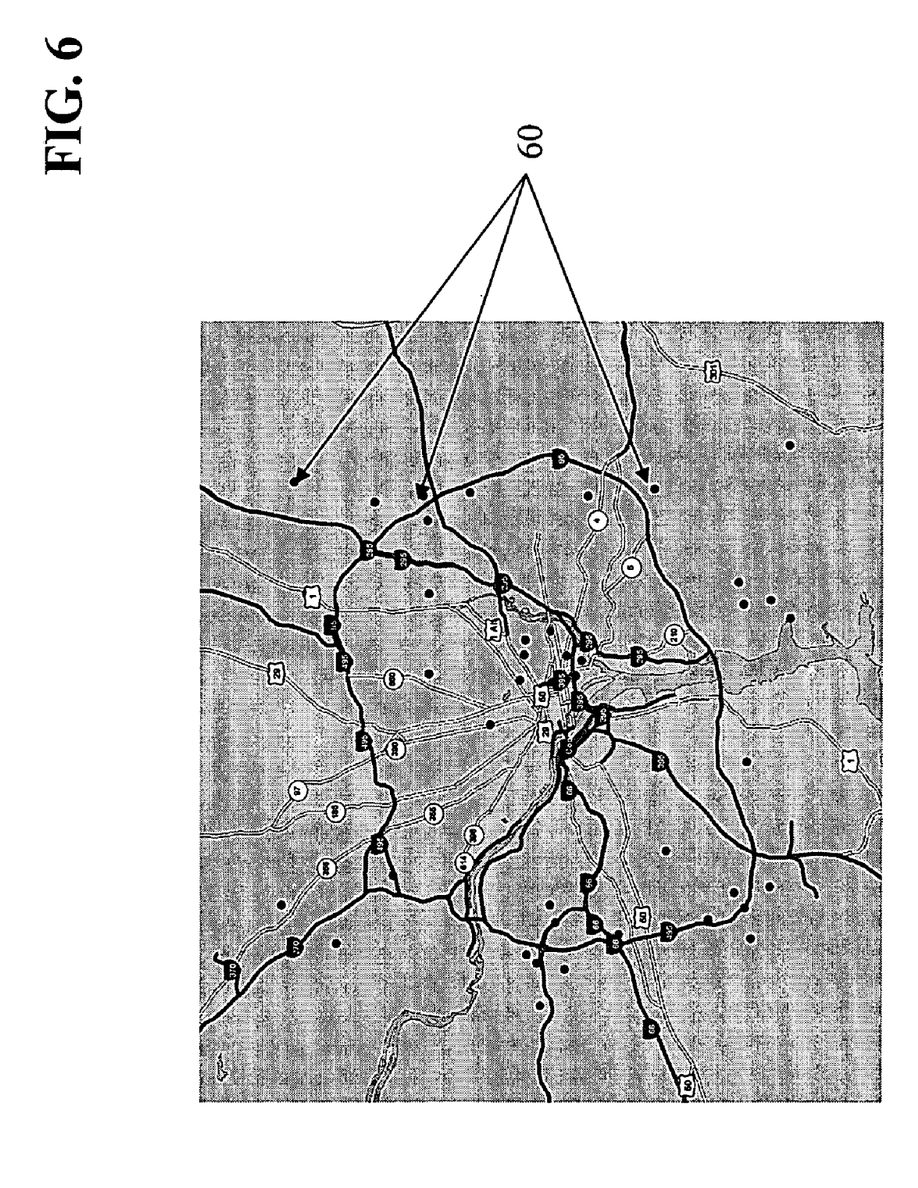
FIG. 6 shows the sample diagram of FIG. 3 with points illustrating past event data in accordance with an illustrative example of employing the present invention as described in the specification.

Once each cell has been measured according to the appropriate factor for the problem to be solved or event to be forecasted, the present invention can receive information pertaining to a location of a meaningful event or events (e.g., a robbery), as indicated at 34 in FIG. 2. The location information can be specified by block and street (e.g., 4400 block of Hill St.), by latitude and longitude, or other known format. As shown in FIG. 6, events can be designated by black dots 60.

Next, the invention can identify the proximity of the event to the variables of interest (e.g., the robbery occurred 0.2 miles from a 7-Eleven, 0.5 miles from a highway, and 2 miles from a river). Based on the identified location, proximity to variables of interest can be determined, much like was done for each cell.

Next, the invention can establish a "raw signature" for the event. For example, if five events (robberies) occur and there are two variables (highway, river), the raw signature might look like that in Table 1 below:

TABLE 1

| Event # | Variable # | Calculation | Special/Feature ID |
|---|---|---|---|
| 1 | 1 (highway) | 0.2 km | 55 |
| 2 | 1 | 0.1 km | 55 |
| 3 | 1 | 1 km | 443 |
| 4 | 1 | 0.7 km | 618 |
| 5 | 1 | 0.15 km | 99 |
| 1 | 2 (river) | 4 km | 12 |
| 2 | 2 | 2 km | 12 |
| 3 | 2 | 7 km | 12 |
| 4 | 2 | 1.2 km | 12 |
| 5 | 2 | 5 km | 12 |

It will be appreciated that the special/feature ID shown in column 4 can be an identifier for the highway (e.g., 55 can be Rte 95, 443 can be Rte. 66, etc.) or other variable.

Figure 7:
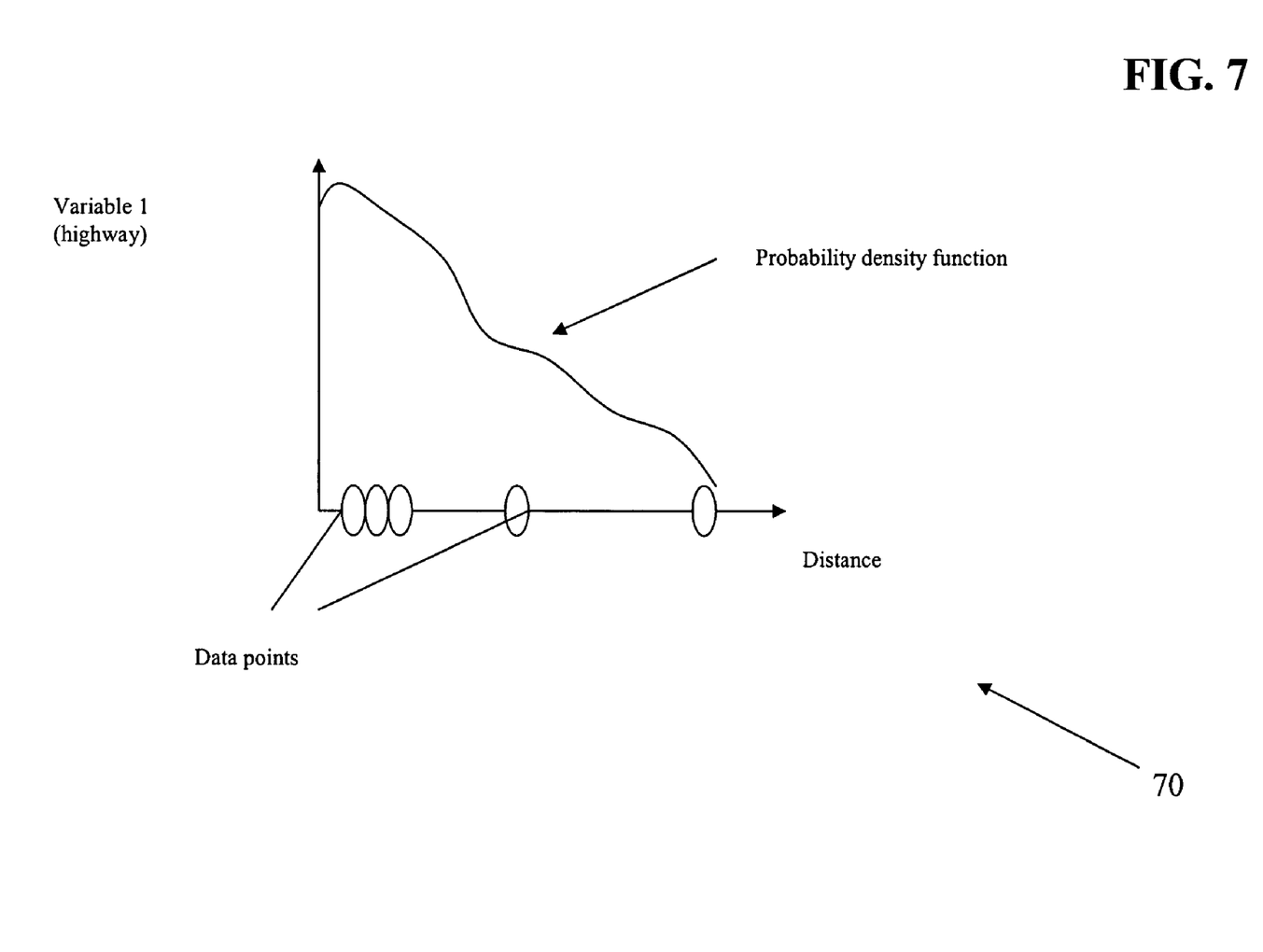
FIG. 7 is an example probability density function in accordance with an illustrative example of employing the present invention as described in the specification.
Figure 8:
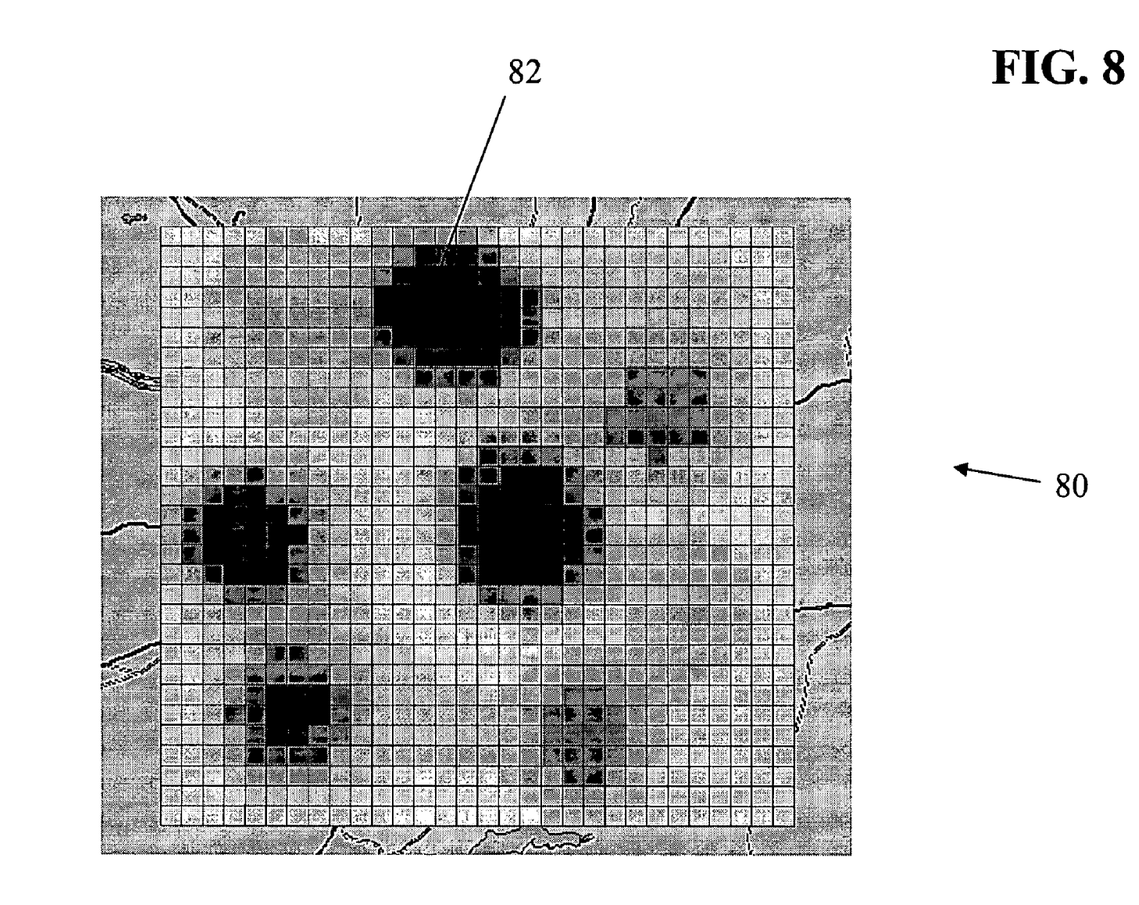
FIGS. 8 through 11 are example diagrams showing graphical "hot spot" representations according to various embodiments of the present invention.

Next, the invention can measure a probability density function for each variable, so as to have a probability associating the events with a variable of interest, as shown by the example graphical representation 70 in FIG. 7. In this example, the five data points from item 7 represent the distance of the five robbery events from a highway. In three cases, the robbery was very close to a highway. One case was somewhat close, and another case was more distant from the highway. The probability density function is performed for all events against each variable individually. While the representation in FIG. 7 is a continuous probability density function, it will be appreciated that histogram-type probability density functions can be provided in connection with discrete variables, such as those identified above (e.g., predominant religion or ethnic group demographics, land utilization, zoning, predominant vegetation, etc.).

Once this is done, a refined signature based on the probability density function can be established. In one embodiment of the invention, the probability density functions can be converted into a binary file, which can then be used in each of the cells outlined above. The processing of the event data from input to a signature is illustrated at step 35 in FIG. 2, for example. At step 36, the event signature is compared with the cell signatures previously determined and stored at step 33.

Next, for each of the cells, a score indicative of that cell's compatibility with the refined signature can be determined, as at 37 in FIG. 2. Each cell will have a probability score associated with each variable. In one case, the total score can be the sum of each of the probability scores.

Figure 9:
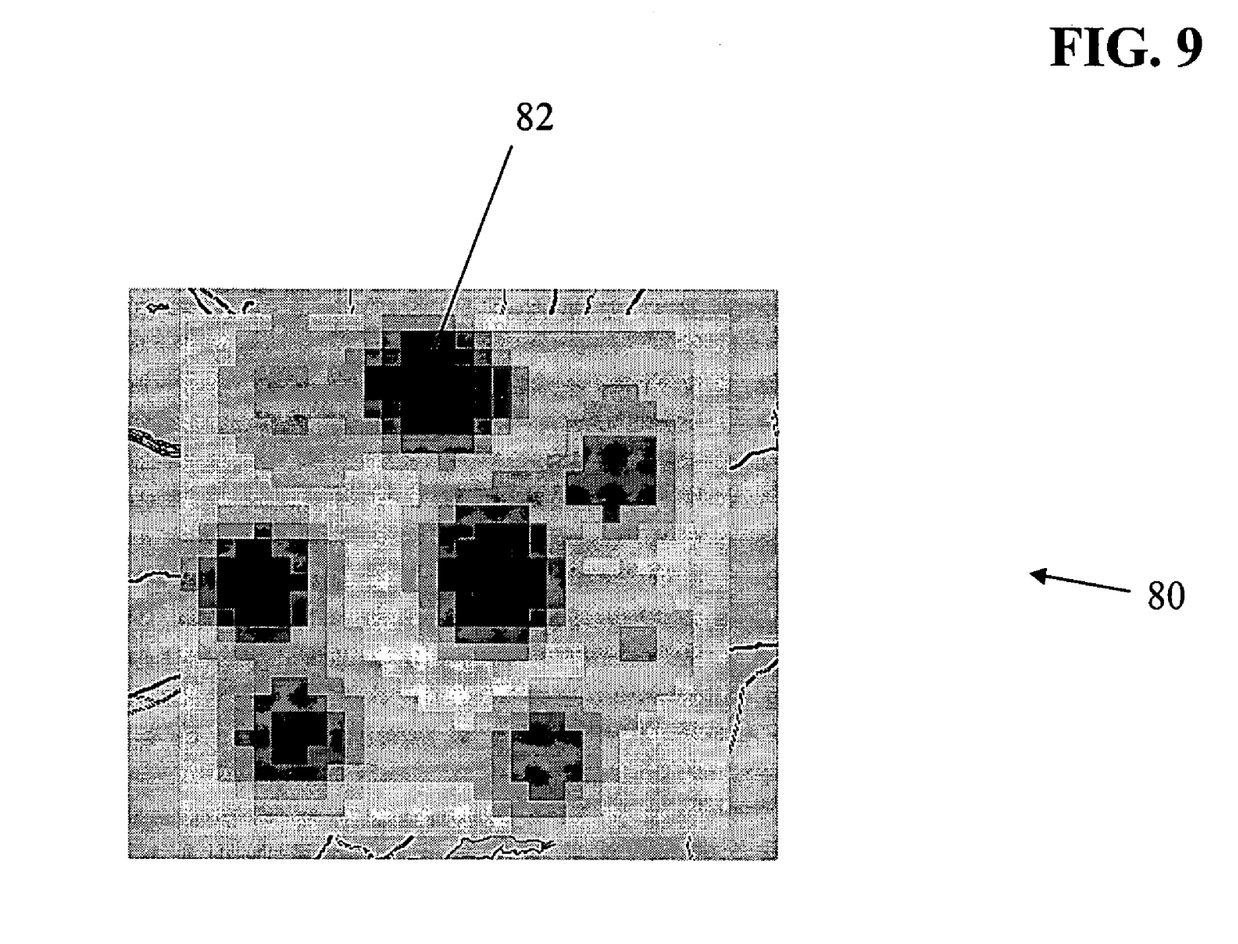
Figure 10:
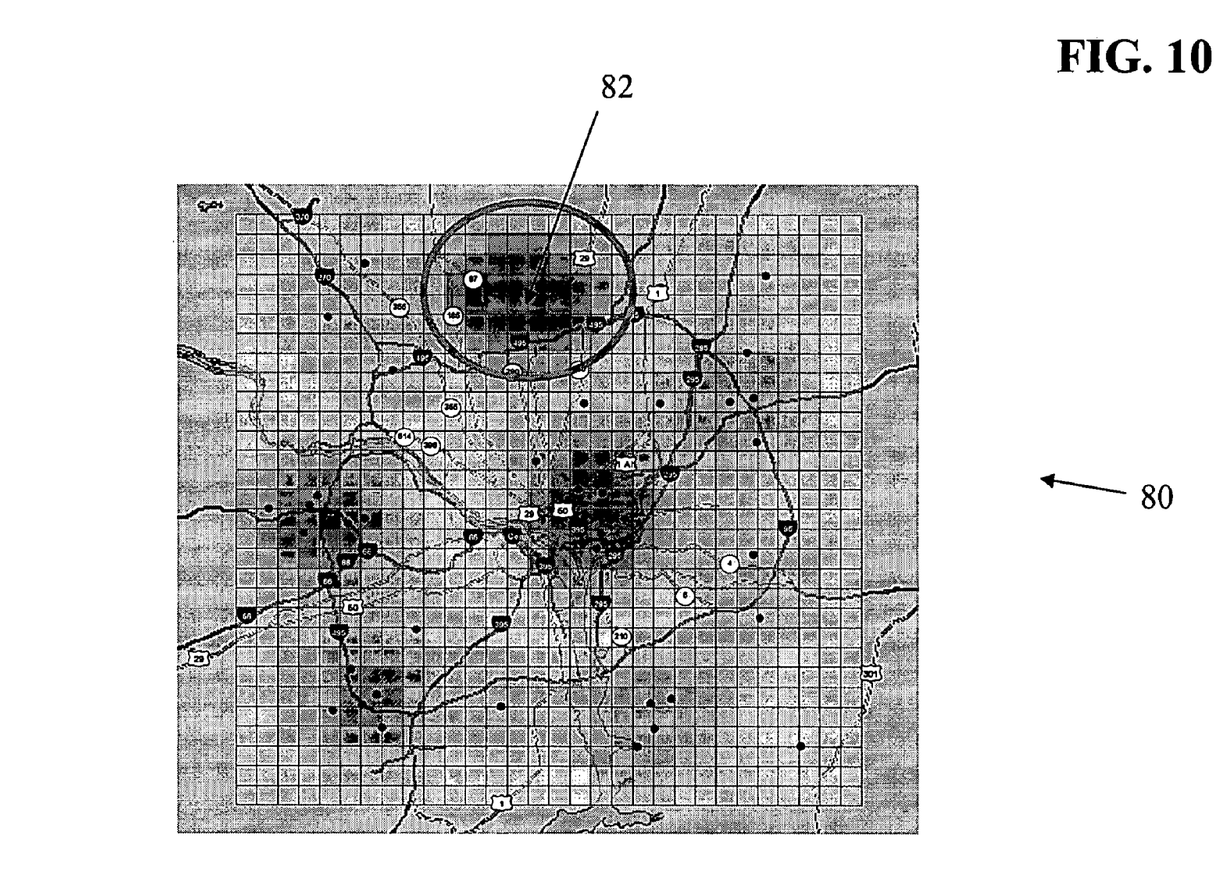
Figure 11:
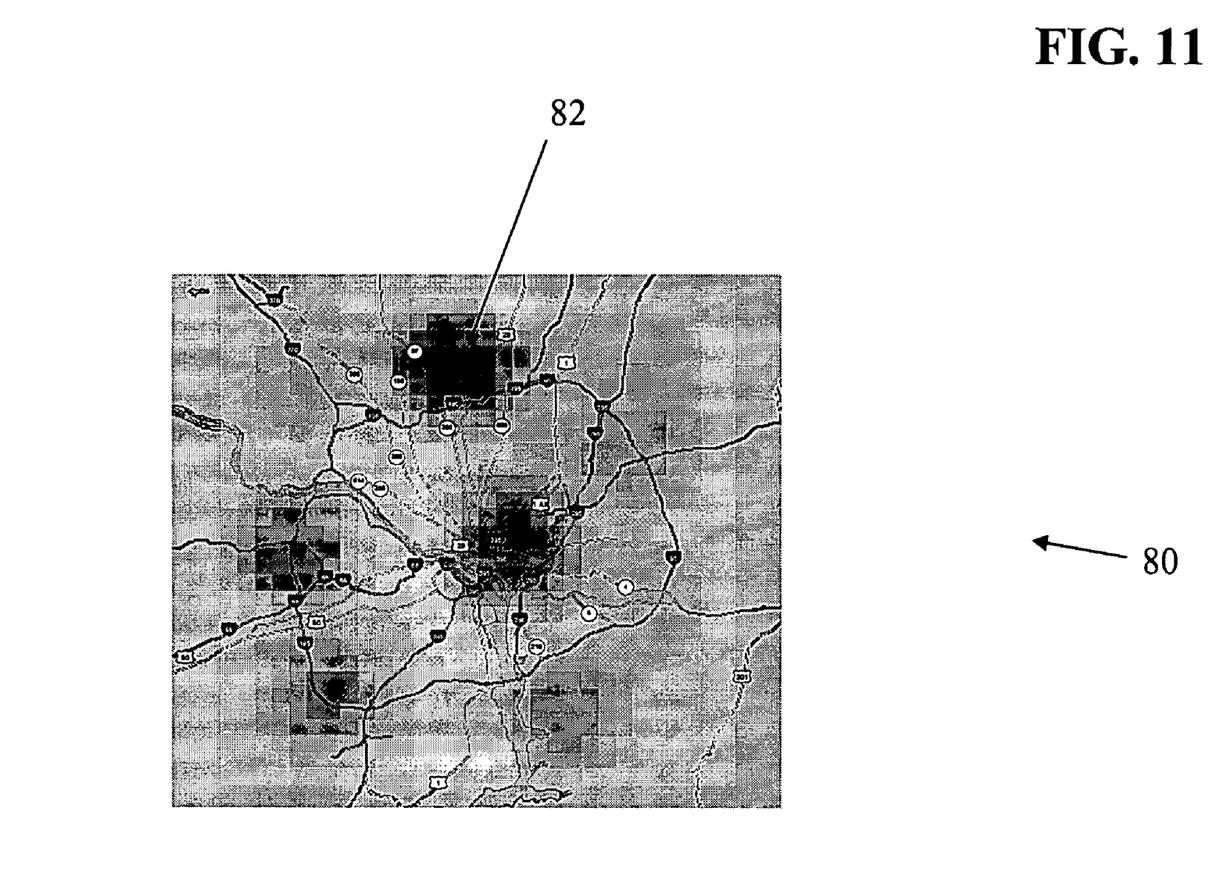

Once the cells have been given a score, the entire boundary 80 can be viewed at a distance to determine geospatial "hot spots" 82, as shown in FIGS. 8 through 11, and indicated at step 38 in FIG. 2. For instance, instead of limiting analysis to particular cells, the entire region can be analyzed for groups of cells that appear to have high probabilities of an event occurring. FIGS. 9 and 11 show the grid 80 without original cell lines, and FIG. 10 shows the cells slightly faded to reveal roads underneath.

In this way, the present invention helps evaluate where a future similar event might occur. Quite often, hotspots are revealed where no prior event has occurred. The system and method of the present invention can thus reveal that the environment in this hotspot is similar to the environment where prior events or results had occurred.

As further shown in FIG. 1, the event likelihood component 25 can interact with a signature transfer component 29, which allows the system or a user to take event signatures (e.g., armed robbery signature) and apply it to a different area of interest as held or entered into the boundary component database 14. In this way, the invention contemplates that events which occur in a separate geographic region (e.g., bank robberies in Richmond, Va.) can be used to determine or predict similar events in another region. The signature transfer component can operate by taking the signatures and/or associated collections of probability functions for given event types in a first region, and applying them within the second region. This can occur via proximity component 20 which accesses a separate set of data from boundary component database 14, or via a separate proximity component 200 which has been pre-established for the second region.

In one embodiment, the event likelihood component acts as a threat forecaster which can render displays showing hot spots associated with a given area of interest. In one embodiment, the threat forecaster can also issue alerts to individuals or units in the field of operation (area of interest) of potential hot spots, using communications techniques known in the art.

In a further embodiment, the invention also contemplates that a given map may have "hot" and "cold" cells that vary depending on time of day, time/day of week, time/day of month, or time/day/season of year. It will be appreciated that the invention can use flat maps and maps adjusted for the earth's curvature. It will also be appreciated that the invention allows portability of analysis, as preprocessed data and event information can be stored in a binary file and used in laptops, PDAs, cell phones or other mobile computing devices in the field.

In law enforcement-type applications, users might desire to employ specific delivery mechanisms (e.g., binary files delivered by wireless communication) for real-time information collection and dissemination. In such applications, the present invention might also use more dynamic variables, such as vehicle density during given hours of given days of the week. Such information might be helpful in determining potential get-away routes for would-be criminals, for example.

The present invention can adapt to real-time communication of events in presenting geospatial analysis and event prediction. For example, the present invention may provide different "hot spot" analysis for a series of events that occur every few days, as opposed to a batch of events that occurred weeks earlier, followed by another batch of events occurring in current time. In the latter scenario, greater weight can be placed on the "live" events in predicting where the next similar event might occur.

It will be apparent to one skilled in the art that any computer system that includes suitable programming means for operating in accordance with the disclosed methods also falls well within the scope of the present invention. Suitable programming means include any means for directing a computer system to execute the steps of the system and method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system. The present invention can further run on a variety of platforms, including Microsoft Windows™, Linux™, Sun Solaris™, HP/IUX™, IBM AIX™ and Java compliant platforms, for example.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. A geospatial event forecasting engine for forecasting the likelihood for occurrence of at least one event type, comprising:
    a boundary component for establishing a geospatial boundary and a grid containing a plurality of cells within said boundary;
    a layer component for establishing at least one layer imposed upon the grid, the layer being indicative of geospatial characteristics of at least one variable of interest unrelated to past event type data for the at least one event type;
    a proximity component for identifying a first proximity measurement of a cell element for each cell to the variable of interest, and for indexing said first proximity measurement for each cell, thereby establishing a database of first proximity measurements unrelated to the event type;
    a signature derivation component for receiving geospatial information related to one or more past events of at least one event type, including location information for said one or more past events, said signature derivation component further identifying and indexing a second proximity measurement from the location information for each of said one or more events to the at least one variable of interest, and deriving a signature pattern for said event type based upon the second proximity measurement; and
    an event likelihood determinant component for determining a level of signature match between said derived signature pattern and at least one cell of said plurality of cells through comparison with said first proximity measurement of said at least one cell as stored in the database of first proximity measurements.

2. The engine of claim 1 wherein said at least one variable of interest is discrete.

3. The engine of claim 1 wherein said at least one variable of interest is continuous.

4. The engine of claim 1 wherein said signature derivation component receives geospatial information related to one or more past events of a plurality of event types, including a first and second event type, and wherein said event likelihood determinant component provides an assessment of the likely location of a first event-type occurrence.

5. The engine of claim 1 wherein said cell element is the cell center point for each of said cells.

6. The engine of claim 1 wherein said signature derivation component establishes said signature using a probability density function.

7. The engine of claim 1 wherein said layer component establishes a plurality of layers, and wherein at least one of said layers is indicative of geospatial characteristics of a plurality of variables.

8. The engine of claim 7 wherein said proximity component identifies and indexes a plurality of proximity measurements for each cell, and wherein said signature derivation component identifies and indexes a plurality of proximity measurements from the location information for each of said one or more events to the one or more variables of interest for each of said layers.

9. The engine of claim 1 wherein said proximity measurement is a nearest neighbor distance measurement or a nearest neighbor value measurement.

10. The engine of claim 1 wherein said event probability determinant component determines a level of signature match for each of said plurality of cells.

11. The engine of claim 10 wherein said event probability determinant component determines a level of signature match by determining a score indicative of each cell's compatibility with the event type signature pattern.

12. The engine of claim 11 wherein said score for each cell can be plotted on a choropleth graph.

13. The engine of claim 1 wherein said at least one variable of interest is provided with a plurality of feature types individually indexed by a respective feature identifier.

14. A method for forecasting the likelihood for occurrence of at least one event type using geospatial information, comprising the steps of:
    establishing a geospatial boundary and a grid containing a plurality of cells within said boundary;

establishing at least one layer imposed upon the grid, the layer being indicative of geospatial characteristics of at least one variable of interest unrelated to past event type data for the at least one event type;

identifying a first proximity measurement of a cell element for each cell to the variable of interest, and for indexing said first proximity measurement for each cell so as to establish a database of first proximity measurements unrelated to the event type;

receiving geospatial information related to one or more past events of at least one event type, including location information for said one or more past events;

identifying and indexing a second proximity measurement from the location information for each of said one or more events to the at least one variable of interest;

deriving a signature pattern for said event type based upon the second proximity measurement; and determining a level of signature match between said derived signature pattern and at least one cell of said plurality of cells through comparison with said first proximity measurement of said at least one cell as stored in the database of first proximity measurements.

15. The method of claim 14 wherein said at least one variable of interest is discrete.

16. The method of claim 14 wherein said at least one variable of interest is continuous.

17. The method of claim 14 wherein said signature derivation component receives geospatial information related to one or more past events of a plurality of event types, including a first and second event type, and wherein said event likelihood determinant component provides an assessment of the likely location of a first event-type occurrence.

18. The method of claim 14 wherein said event probability determinant component establishes said signature using a probability density function.

19. The method of claim 14 wherein said layer component establishes a plurality of layers, and wherein at least one of said layers is indicative of geospatial characteristics of a plurality of variables.

20. The method of claim 19 wherein said proximity component identifies and indexes a plurality of proximity measurements for each cell, and wherein said signature derivation component identifies and indexes a plurality of proximity measurements from the location information for each of said one or more events to the one or more variables of interest for each of said layers.

21. The method of claim 14 wherein said proximity measurement is a nearest neighbor distance measurement or a nearest neighbor value measurement.

22. The method of claim 14 wherein said event probability determinant component determines a level of signature match for each of said plurality of cells.

23. The method of claim 14 wherein said event probability determinant component determines whether there is a signature match by determining a score indicative of each cell's compatibility with the event type signature.

24. The method of claim 23 wherein said score for each cell can be plotted on a choropleth graph.

25. The method of claim 14 wherein said at least one variable of interest is provided with a plurality of feature types individually indexed by a respective feature identifier.

26. A system for forecasting the likelihood for occurrence of at least one threat type, comprising:

a geospatial database storing boundary and layer information for a plurality of areas of interest, said layer information being indicative of geospatial characteristics of a plurality of variables of interest unrelated to past threat type data for the at least one threat type;

a proximity engine for identifying and indexing first proximity measurements to each of said variables of interest for a plurality of cells within each area of interest;

a signature derivation component for receiving geospatial information related to one or more past threats of at least one threat type, including location information for said one or more past events, and identifying and indexing a second proximity measurement from the location information for each of said one or more threats to the at least one variable of interest, and deriving a signature pattern for said threat type; and a threat forecasting component for determining a level of signature match between said derived signature pattern and at least one cell of said plurality of cells through comparison with said first proximity measurements, said threat forecasting component being capable of rendering a two-dimensional display of an area of interest associated with said plurality of cells, said display including a representation of said level of signature match.

27. A geospatial event forecasting engine, comprising:

a boundary component for establishing first and second geospatial boundaries and a grid containing a plurality of cells within each of said boundaries;

a layer component for establishing at least one layer imposed upon each grid, the layer being indicative of geospatial characteristics of at least one variable of interest;

a proximity component for identifying a proximity measurement of a cell element for each cell of each arid to the variable of interest, and for indexing said proximity measurement for each cell of each grid;

a signature derivation component for receiving geospatial information related to one or more past events of at least one event type within said first boundary, including location information for said one or more past events, said signature derivation component further identifying and indexing a proximity measurement from the location information for each of said one or more events to the at least one variable of interest within said first boundary, and deriving a signature pattern for said event type associated with said first boundary;

an event likelihood determinant component for determining a level of signature match between said derived signature pattern and at least one cell of said plurality of cells in said first boundary through comparison with said proximity measurement for said first boundary; and a signature transfer component for applying said established signature from said first boundary to said indexed proximity measurements of said second boundary and determining a level of signature match between said established signature and at least one cell of said plurality of cells in said second boundary.

* * * * *